United States Patent [19]

Jackson et al.

[11] 3,876,623

[45] Apr. 8, 1975

[54] PROCESS FOR PURIFYING INSULIN

[75] Inventors: Richard L. Jackson; John G. Stilz, both of Indianapolis, Ind.

[73] Assignee: Eli Lilly and Company, Indianapolis, Ind.

[22] Filed: May 9, 1973

[21] Appl. No.: 358,554

[52] U.S. Cl. .......................................... 260/112.7
[51] Int. Cl. . A61k 17/04; C07c 103/52; C07g 7/00
[58] Field of Search ...................... 260/112.5, 112.7

[56] References Cited
UNITED STATES PATENTS

| | | | |
|---|---|---|---|
| 3,002,823 | 10/1961 | Flodin et al. | 260/112.7 |
| 3,069,323 | 12/1962 | Volini et al. | 260/112.7 |
| 3,073,747 | 1/1963 | Reid | 260/112.7 |
| 3,468,870 | 9/1969 | Smith et al. | 260/112.7 |
| 3,502,545 | 3/1970 | Westman et al. | 260/112.7 |
| 3,715,345 | 2/1973 | Smith | 260/112.7 |

OTHER PUBLICATIONS

Epstein et al.; Biochem., 2, pp. 461–464, (1963).

*Primary Examiner*—Lewis Gotts
*Assistant Examiner*—Reginald J. Suyat
*Attorney, Agent, or Firm*—William E. Maycock; Everet F. Smith

[57] ABSTRACT

Alkali metal or ammonium insulin is purified by gel filtration.

13 Claims, No Drawings

PROCESS FOR PURIFYING INSULIN

BACKGROUND OF THE INVENTION

This invention relates to the production of insulin. More particularly, this invention relates to the production of high-purity insulin by means of gel filtration.

Since its discovery in 1921 as a component of the pancreas, insulin has assumed world-wide importance in the treatment of diabetes mellitus. Because the extraction procedures employed to remove insulin from pancreas tissue also remove substantial amounts of noninsulin protein, considerable effort has been expended in developing methods for purifying insulin; i.e., methods for separating insulin from noninsulin protein. Several of the methods developed for purifying insulin have achieved commercial importance.

Of these commercially-important methods, one of the earliest involved the general phenomenon that a protein has minimum solubility at the isoelectric point, other factors being kept constant. Banting, et al., disclosed in U.S. Pat. No. 1,469,994 a purification process which comprises precipitating at their isoelectric point noninsulin proteins contained in an aqueous extract of pancreas. The isoelectric precipitation of insulin from an aqueous pancreatic extract at a pH of from about 4 to about 7 then was disclosed by Walden in U.S. Pat. No. 1,520,673.

In another early method, precipitation of insulin was effected by the addition of a sufficient amount of an inorganic salt. Murlin, in U.S. Pat. No. 1,547,515, disclosed the first process for salting out insulin from an extraction solvent by the addition of sodium chloride. A differential salting out process was described by Lautenschlager, et al., in U.S. Pat. No. 2,449,076, which process comprises salting out insulin from a neutralized extract by the addition of sodium chloride, filtering, redissolving the residue and again salting out the insulin, but with a salt concentration lower than that employed in the first salting-out step.

A third commercially-important method for purifying insulin involves the precipitation or crystallization of insulin from solution as a zinc insulin complex. In general, zinc insulin is precipitated from a buffered, aqueous solution containing zinc ions. Various buffers have been employed; Petersen, for example, in U.S. Pat. No. 2,626,228, utilized a citric acid-citrate buffer.

Present commercial processes for the purification of insulin typically involve all three of the above methods. Because zinc insulin is the most important commercial form of insulin, the last step in insulin purification normally is a zinc crystallization step.

However, noninsulin proteins, of which proinsulin and proinsulin-like protein are the most prevalent, have been recognized in recent years as minor components of commercial zinc insulins. Although such components generally constitute less than about 8 weight percent of commercial zinc insulins, some of these components are believed to be antigenic or immunogenic in nature. See, for example, Chance, et al., *Science*, 161, 165 (1968); Steiner, et al., *Diabetes*, 18, 725 (1968); Bromer, *BioScience*, 20, 701 (1970); and Rubenstein, et al., *Ann. Rev. Med.*, 22, 1 (1971).

A continuing problem, then, is the removal on a commercial scale of noninsulin proteins from insulin.

The term "insulin" as used herein includes not only insulin per se, but also all insulin-like proteins, such as desamido insulin. Because insulin and insulin-like proteins have similar hypoglycemic activities, it usually is not required to separate insulin from all other pancreatic proteins; i.e., a homogenous insulin normally is not required.

Techniques for the resolution of biological substances on an analytical scale, such as electrophoresis and ion-exchange chromatography, are known to separate noninsulin components from the insulin component of commercial (or even crude) insulin preparations. These techniques can even resolve the insulin component into insulin per se and desamidated insulins. However, such procedures have questionable utility on a large scale.

A procedure more readily adaptable to large-scale use is gel filtration (a term synonymous with gel exclusion chromatography and gel permeation chromatography). In this method, proteins are separated on a column containing a gel which has been crosslinked in such a manner that pores are formed within each gel particle. These pores have a finite, measurable volume which is directly proportional to the degree of swelling of the gel and inversely proportional to the degree of crosslinking. Because smaller molecules have more complete access to these pores than larger molecules, the progress of smaller molecules through the column is impeded relative to larger molecules which have only partial or no access to the pores.

Gel filtration in the past has been employed in the purification of insulin. In the isolation of insulin from a single cat pancreas, crude insulin was obtained by acid-alcohol extraction followed by an alkaline precipitation to remove inactive material, concentration, an isoelectric precipitation, and finally a sodium chloride salting-out precipitation. The crude insulin then was applied to a crosslinked dextran gel column and eluted with 1.0 M acetic acid. Davoren, *Biochim. Biophys. Acta*, 63, 150 (1962).

In the isolation of insulin from fish, glands were homogenized in water and proteins precipitated with trichloroacetic acid solution. The precipitate was extracted with acid-ethanol and the extracts were treated with methylene chloride to remove lipids. The remaining solids were isolated and taken up in 5.0 M acetic acid and filtered on a crosslinked dextran gel column with 5.0 M acetic acid as the eluting solvent. Humbel, *Biochem. Biophys. Res. Commun.*, 12, 333 (1963). Yields of about 80 percent were reported. It should be noted that Humbel states that for good separation of insulin from other proteins, elution conditions should favor dissociation of insulin molecules. He further suggests that 1.0 M acetic acid is not a satisfactory solvent since, according to Yphantis and Waugh [*Biochim. Biophys. Acta*, 26, 218 (1957)], insulin is not completely dissociated therein.

Crude extract of beef pancreas was filtered on a crosslinked dextran gel by Epstein, et al., *Biochemistry*, 2, 461 (1963). The eluting solvent was 0.2 M ammonium bicarbonate, a solvent also condemned by Humbel, supra. Epstein, et al., reported a yield of about 60 percent.

Insulin has even been isolated from human pancreas. The glands were first homogenized and extracted. An ammonium sulfate fractionation removed some inactive material. Insulin then was precipitated, first with sodium chloride, then with an isoelectric precipitation. The resulting insulin was dissolved in 0.5 N acetic acid and filtered on a crosslinked dextran gel. The filtered insulin then was converted to zinc insulin. Jackson, et al., *Diabetes*, 18, 206 (1969). The yield of insulin after gel filtration was about 60 percent.

Finally, gel filtration and ion-exchange chromatography were combined by Schlichtkrull, et al., in South Africa 69/5280 (for an equivalent patent, see Belgian Pat. No. 737,257). In the only gel filtration example (Example 1), zinc insulin was filtered on a crosslinked dextran gel column with a yield of 80 percent. The eluting solvent was 1.0 M acetic acid. It should be noted that Schlichtkrull, et al., found it necessary, after filtration, to go through salting out, isoelectric precipitation, and zinc crystallization procedures in order to obtain zinc insulin.

Each of the prior art applications of gel filtration to the purification of insulin has resulted in substantial insulin loss. Furthermore, from the prior art, there is no reliable indication that only insulin (including insulin-like proteins as discussed hereinabove) is obtained as a result of the use of gel filtration.

SUMMARY OF THE INVENTION

It therefore is an object of the present invention to provide a process for the gel filtration purification of insulin which optimizes recovery of high-purity insulin.

A further object of the present invention is to provide a process for purifying insulin which utilizes gel filtration without the usual prior art problems associated therewith.

These and other objects will be apparent to those skilled in the art from a consideration of the specification and claims which follow.

According to the present invention, insulin is purified by the process which comprises the steps of swelling a gel having in the dry state a water regain of at least about 4 percent by weight and particle sizes smaller than about 100 microns in diameter; packing a column with the swollen gel; adding to the packed column an aqueous solution, having a pH of from about 7.5 to about 9.5, of an alkali metal or ammonium insulin having a purity of at least about 80 percent; and eluting the insulin from the column, at a temperature in the range of from about 5° to about 30°C., with an aqueous eluant having a pH within the same range as that of the insulin solution. The concentration of the insulin solution is in the range of from about 1 to about 8 percent, weight per volume. The total amount of insulin added to the column is sufficient to provide a column loading of from about 0.8 to about 6.7 grams per liter of bed volume.

By means of the process of the present invention, insulin having a purity higher than that possible by prior art procedures is obtained.

DETAILED DESCRIPTION OF THE INVENTION

In general, any water-swellable gel suitable for use with protein solutes can be employed in the process of the present invention. However, such a gel shall have in the dry or nonswollen state a water regain of at least about 4 percent by weight, based on the weight of dry gel, and particle diameters smaller than about 100 microns. Preferably, the water regain of the gel will be in the range of from about 4 to about 98 percent, and most preferably from about 5 to about 20 percent. Preferably, the diameters of the dry gel particles will be smaller than about 80 microns; a particularly useful range of particle diameters is from about 20 to about 80 microns.

Examples of suitable gels include, among others, starch (including maize starch), crosslinked galactomannan, crosslinked dextran, agar or agarose, polyacylamides, copolymers of acylamide and methylene bis-acrylamide, copolymers of methylene bis-acrylamide with vinylethyl carbitol and with vinyl pyrrolidone, and the like. The preferred gels are crosslinked dextrans, such as the Sephadex series from Pharmacia Fine Chemicals, Inc., Piscataway, N.J.

The type of column employed in the process of the present invention is not critical. The choice of column height, diameter, or configuration will depend upon the operating parameters desired. Of course, as column height increases the flow rate decreases; stated differently, column back-pressure is directly proportional to column height. For this reason, a stacked column configuration is preferred, such as the Pharmacia Sectional Column KS-370. For normal production purposes, a stack of six sections serves quite well.

As an approximation, satisfactory insulin purification can be accomplished at column loadings of about 4.5 grams of alkali metal or ammonium insulin per liter of bed volume, which loading is most preferred. However, column loadings generally can range from 0.8 to about 6.7 grams per liter of bed volume, while the preferred range is from about 3.5 to about 5.0 grams per liter of bed volume. Of course, optimum conditions can be determined readily for any given column.

The gel can be swollen and the column packed with the swollen gel by any of the various methods known to those skilled in the art. In general, the gel will be swollen in the eluting medium. Alternatively, the gel can be swollen in 30 percent aqueous ethanol, the fines decanted, and the swelling medium replaced with eluting medium.

In general, the alkali metal or ammonium insulin is dissolved in distilled water and the pH adjusted as desired with dilute base or dilute organic buffer. Suitable bases include sodium hydroxide, potassium hydroxide, lithium hydroxide, ammonium hydroxide, and the like. Sodium hydroxide is preferred. Examples of suitable organic buffers include glycine-sodium hydroxide, tris-(hydroxymethyl)aminomethane, and the like.

In general, the alkali metal or ammonium insulin can be prepared by any of the known methods. It is preferred, however, that the alkali metal or ammonium insulin be prepared by the process of U.S. Pat. No. 3,719,655. As indicated hereinbefore, however, said insulin must have a purity of at least about 80 percent. That is, the content of insulin, including insulin-like proteins having hypoglycemic activity, must be at least about 80 percent of the total proteins present.

The concentration of alkali metal or ammonium insulin in the insulin solution applied to the column will be, as stated hereinabove, from about 1 to about 8 percent, weight per volume. The preferred concentration is from about 4 to about 6 percent.

For satisfactory results, the alkali metal or ammonium insulin should be dissolved in a volume of solvent which is less than the separation volume, discussed hereinbelow.

In chromatography, the distribution coefficient, $K_d$, is defined as the ratio of the concentration of solute in the mobile phase to the concentration of solute in the stationary phase. In gel filtration, the mobile phase is the solvent moving in the void space between gel particles and the stationary phase is the solvent imbibed in the gel particles, i.e., trapped in the pores within each gel particle. Thus, $K_d$ indicates that fraction of imbibed solvent which is penetratable by a solute.

In terms of $K_d$, the elution volume, $V_e$, of a solute can be expressed by the equation, $$V_e = V_o + K_d \cdot V_i$$

where $V_o$ is the void volume of the column and $V_i$ is the volume of imbibed solvent. Solving for $K_d$, the equation becomes, $$K_d = V_e = V_o/V_i$$

If the density of water is assumed to be unity, $V_i = a \cdot W_r$, where $a$ is the weight of dry gel and $W_r$ is the water regain. Thus, $K_d$ becomes $$K_d = V_e - V_o/aW_r$$

which can be determined experimentally by those skilled in the art.

Assuming a solution contains two solutes, the elution volume for each solute is expressed as follows:

$$V_e' = V_o + K_d'V_i$$
$$V_e'' = V_o + K_d''V_i$$

The separation volume, $V_s$, is the difference between the elution volumes of the two solutes:

$$V_s = V_e'' - V_e'$$
$$V_s = (K_d'' - K_d')V_i$$

From the foregoing, it is apparent that the degree of separation of two (or more) solutes is in part dependent upon the column load. As the amount of lower molecular weight solute approaches the limit of accessible pores, the separation between two solutes necessarily must decrease. Within the load limits specified as a part of the present invention, the degree of separation can vary. In some instances, a higher column loading may be selected to balance separation versus productivity.

As stated hereinbefore, the eluting medium can have a pH in the range of from about 7.5 to about 9.5. Usually, the eluting medium will be an aqueous solution of the same base or buffer employed in the preparation of the insulin solution.

If desired, the eluting medium can contain up to about 0.02 moles per liter of inorganic salt, such as sodium chloride, potassium chloride, ammonium chloride, and the like. The preferred concentration is 0.01 M and the preferred salt is sodium chloride. The use of such a salt is preferred to improve resolution and to prevent basic substances from being absorbed by the gel.

Elution of the column can be carried out at temperatures in the range of from about 5° to about 30°C. Preferably, the process temperature will be at ambient temperature or lower.

The course of elution is followed by any convenient means. A particularly useful method, however, consists of measuring the ultraviolet absorption at 280 m$\mu$ of each fraction. Those fractions representing the desired purified insulin component are combined and, usually, converted to zinc insulin.

As indicated hereinbefore, zinc insulin is the most important form of insulin. Consequently, the high purity alkali metal or ammonium insulin obtained by the process of the present invention usually will be converted to zinc insulin. Conversion to zinc insulin preferably is made at pH 6.0 in the presence of ammonium acetate buffer. It is not necessary to isolate the alkali metal or ammonium insulin from the eluting medium, or to concentrate the solution of purified insulin before crystallizing with zinc. An advantage of the present invention is that the insulin in solution as eluted is sufficiently concentrated that salt or isoelectric precipitations are not required, although such procedures can be employed, if desired.

The zinc insulin thus obtained has an improved purity as a result of the process of the present invention. This improved purity can be demonstrated by several methods. The zinc insulin can be analyzed directly for noninsulin protein components such as proinsulin and glucagon. The presence of high molecular weight proteins, which typically include protaminase, a proteolytic enzyme, can be determined by measuring the stability of protamine insulin suspension at elevated temperatures; if protaminase is present, the protamine insulin complex will dissociate because of protamine degradation. Physical properties, such as solubility of the zinc insulin at neutral pH and color of the resulting solution, can be measured. Finally, the specific activity of the insulin can be measured by biological and immunological assays.

Because of increased purity, the zinc insulin obtained after carrying out the process of the present invention is a desirable material for formulation into the various pharmaceutical forms of insulin, e.g., regular insulin, isophane insulin, protamine zinc insulin, zinc insulin suspension, globin insulin, and the like. Further, the purer zinc insulin permits the preparation of a neutral insulin which is more stable than acidic insulin; impurities that heretofore were present in zinc insulin often partly precipitated at a neutral pH. Such impurities often would include insulin-degrading enzymes, such as trypsin and chymotrypsin, which decreased the potency of the insulin preparation. The purer zinc insulin also permits the formulation of extended action pork and beef insulin preparations without additional purification as required in the past. Finally, the preparation of isophane insulin from the purer zinc insulin requires less protamine since the absence of acidic protein impurities permits the use of only that amount of protamine required to precipitate the insulin.

The process of the present invention can be combined as desired with other purification procedures. For example, the alkali metal or ammonium insulin solution can be subjected to one or more filtration operations prior to carrying out the gel filtration. Also, the eluted insulin can be subjected to one or more filtration operations prior to conversion to zinc insulin.

EXAMPLE

Beef sodium insulin, 5.53 g., having a potency of 26.4 Units/mg. and a proinsulin content of 7.2 weight percent, was suspended in distilled water. Dilute sodium hydroxide was added to a pH of 9.0. The volume of the resulting solution was 100 ml. A crosslinked dextran gel having a water regain of 5 percent and particle sizes of from 20 to 80 $\mu$ equilibrated in aqueous sodium hydroxide having a pH of 9.0. The swollen gel was used to pack a 4.0 × 43.0-cm. column having a bed volume of 540 ml. A 40-ml. aliquot of the insulin solution was added to the column. The column then was eluted with pH 9.0 aqueous sodium hydroxide, with about 6.5-ml.

fractions being collected. Elution was followed by measuring ultraviolet absorption at 280 mμ. The fractions corresponding to the insulin component were combined and acidified to a pH of 3.0 with 6 N hydrochloric acid. The resulting solution was filtered, zinc chloride added, and zinc insulin isolated at pH 6.0 from ammonium acetate buffer. The yield of zinc insulin was 1.85 g., corresponding to a yield of 82.5 percent, based on starting material. The insulin had a potency of 26.8 Units/mg. and a proinsulin content of less than 0.05 weight percent; recovery on a Unit basis was 83.8 percent.

A 37.5-ml. aliquot of the original insulin solution was converted directly to zinc insulin as described above, without going through the gel filtration step. Recovery was 1.87 g. (90.1 percent) of zinc insulin having a proinsulin content of 5.4 weight percent.

What is claimed is:

1. A process for purifying an alkali metal or ammonium insulin which comprises the steps of:
   A. swelling a gel having in the dry state a water regain of at least about 4 percent by weight and particle diameters smaller than about 100 microns;
   B. packing a column with the swollen gel;
   C. adding to the packed column an aqueous solution of an alkali metal or ammonium insulin having a purity of at least about 80 percent, wherein the insulin concentration is in the range of from about 1 to about 8 percent, weight per volume, the total amount of insulin is sufficient to provide a column loading in the range of from about 0.8 to about 6.7 grams per liter of bed volume, and the pH of the solution is in the range of from about 7.5 to about 9.5; and
   D. eluting the insulin from the column, at a temperature in the range of from about 5° to about 30°C., with an aqueous eluant having a pH in the same range as that of the insulin solution.

2. The process of claim 1, wherein said gel has a water regain in the range of from about four to about 98 percent.

3. The process of claim 2, wherein said gel has a water regain in the range of from about five to about 20 percent.

4. The process of claim 3, wherein said gel is a crosslinked dextran.

5. The process of claim 4, wherein said gel has a water regain of about 5 percent.

6. The process of claim 5, wherein the particle diameters of said gel are in the range of from about 20 to about 80 microns.

7. The process of claim 1, wherein the column loading is in the range of from about 3.5 to about 5.0 grams per liter of bed volume.

8. The process of claim 7, wherein the column loading is about 4.5 grams per liter of bed volume.

9. The process of claim 1, wherein the eluant contains an inorganic salt at a concentration of up to about 0.02 M.

10. The process of claim 9, wherein the inorganic salt is present at a concentration of about 0.01 M.

11. The process of claim 10, wherein said inorganic salt is sodium chloride.

12. The process of claim 1, wherein elution is carried out at ambient temperature.

13. The process of claim 1, wherein elution is carried out at 5°C.

* * * * *